United States Patent [19]

Brannon

[11] Patent Number: 4,825,577

[45] Date of Patent: May 2, 1989

[54] LIVE BAIT DISPENSER

[76] Inventor: Roland Brannon, P.O. Box 586, Morgan City, La. 70381

[21] Appl. No.: 64,864

[22] Filed: Jun. 19, 1987

[51] Int. Cl.⁴ ............................................. A01K 97/04
[52] U.S. Cl. .......................................................... 43/55
[58] Field of Search ........................................... 43/55, 4

[56] References Cited

U.S. PATENT DOCUMENTS

| 2,160,436 | 5/1939 | Jones | 43/55 |
| 2,857,705 | 10/1958 | Woodcock | 43/55 |
| 2,948,986 | 8/1960 | Williamson | 43/55 |
| 2,949,691 | 8/1960 | Johnson | 43/55 |
| 3,143,263 | 8/1964 | Farmer | 43/55 X |
| 3,308,570 | 3/1967 | Horton | 43/55 |
| 3,541,722 | 11/1970 | Garrison | 43/4 |
| 4,047,320 | 9/1977 | Lee | 43/55 |

Primary Examiner—Nicholas P. Godici
Assistant Examiner—Carmine Cuda
Attorney, Agent, or Firm—Keaty & Keaty

[57] ABSTRACT

The invention discloses a live bait dispenser for receiving and retaining a plurality of live baits, such as crickets and comprising devices to allow dispensing of the live bait one at a time, while preventing escape of the live bait from the dispensing area.

11 Claims, 10 Drawing Sheets

LIVE BAIT DISPENSER

BACKGROUND OF THE INVENTION

The present invention relates to bug dispensers and specifically to live cricket dispensers as used for example, by fishermen as live bait.

It is a common knowledge that such live bait as crickets is rather costly and various devices have been offered on the market to reduce the number of dispensed crickets to one at a time, while reducing the possibility of other crickets which are held in one container of escaping through an opening by which access to the holding chamber is achieved. Some of the known devices provide for a one-way access reduced diameter chamber into which a cricket would crawl and from which the fisherman would withdraw a cricket by hooking it while it is still in the reduced diameter chamber. Many of these devices though suffer one major drawback: the cricket must be manipulated by hand or the trap door which encloses the reduced diameter chamber must be manually operated.

Other devices provide for the use of a plug which closes the opening to the reduced diameter section, so that the plug has to be removed and the cricket is pulled out from the restricted diameter chamber.

Still, other known devices allow the cricket to escape from the reduced diameter chamber into the holding chamber, thereby causing a delay in withdrawing a single cricket from the dispenser, thereby making the cricket dispenser difficult to operate and not attractive in the eyes of a fisherman.

Many of the devices have also not used the fact that crickets are incapable of climbing on a smooth surface and, once caught in a chamber which has smooth walls, are incapable of returning back to the larger holding chamber.

Another characteristic of a cricket's behavior which has not been taken into consideration previously is the fact that when the cricket moves forward, it touches objects in front of him with its antennas, and once an obstacle forming a narrow passage is sensed by its antennas, the cricket stops its movement. It has been also observed that the cricket cannot move backwards if his hind legs touch an obstacle behind the cricket.

It is therefore an object of the present invention to provide for an inexpensive, portable live bait dispenser, for example, crickets, which allows dispensing of the crickets one at a time, without the necessity to manually handle the cricket or to manually operate access or trap doors.

SUMMARY OF THE INVENTION

The present invention cures the above-noted shortcomings of the present state of the art and achieves the objects in a simple and straightforward manner.

The live bait dispenser of the present invention comprises a housing for receiving and retaining a plurality of live baits, such as crickets, in the interior chamber formed in the housing. At least one dispensing conduit is attached in communication with the housing so that crickets crawl from the interior of the housing into the dispensing conduit, the conduit being such a diameter so as to accomodate one cricket. The cricket becomes entrapped in the dispensing conduit and cannot escape or reverse its movement without manipulation by a fisherman. The end of the dispensing conduit is provided with a spring operated hingedly attached exit door having two flaps, which can be pushed open by fish hooking the individual bait which has reached the end of the conduit. The exit doors of the dispensing conduit do not have to be manually manipulated to fling them open. A pair of diametrically opposing slots are made in the end portion of the conduit, extending a distance from the end towards the center of the conduit. The slots are designed to allow fish hooking of the individual bait. A trap means, in the form of a hinged trap door, is mounted in a position adjacent the inner most end of the elongated slot, so as to prevent the individual bait which has reached the dispensing area at the end of the dispensing conduit to move back into the central area of the dispensing conduit or back into the housing. The conduits in some of the embodiments extend transversely to a vertical axis of the housing or at an angle to the vertical axis to the housing, with the interior of the conduits of some of the embodiments being made smooth to prevent the live bait from returning into the retaining chamber. A container housing in some of the embodiments is provided with frustoconical bottom, which takes advantage of the inability of crickets climbing upon smooth surfaces and allows for a great number of crickets to be concentrated in the apex of the cone, which makes it easier for a fisherman to reach into the container from the top, if necessary, and pull out a cricket. Some embodiments of the invention provide for the detachable dispensing unit which is interconnected with the container housing or used alone for dispensing individual crickets. Trap doors provided within the conduits prevent escape of a cricket which positioned himself within the dispensing conduit, but not within the dispensing area, so that only the cricket which has reached the exit door of the dispensing unit is removed, while the second cricket is still retained within the dispensing conduit. At least a portion of the housing is made of mesh material to allow air circulation within the housing.

BRIEF DESCRIPTION OF THE DRAWINGS

A better understanding of the nature and operation of the embodiments of the invention will be achieved with the following description of the invention taken in conjunction with the appended drawings, wherein.

DETAILED DESCRIPTION OF THE PREFERRED EMBODIMENT

Figure 1:
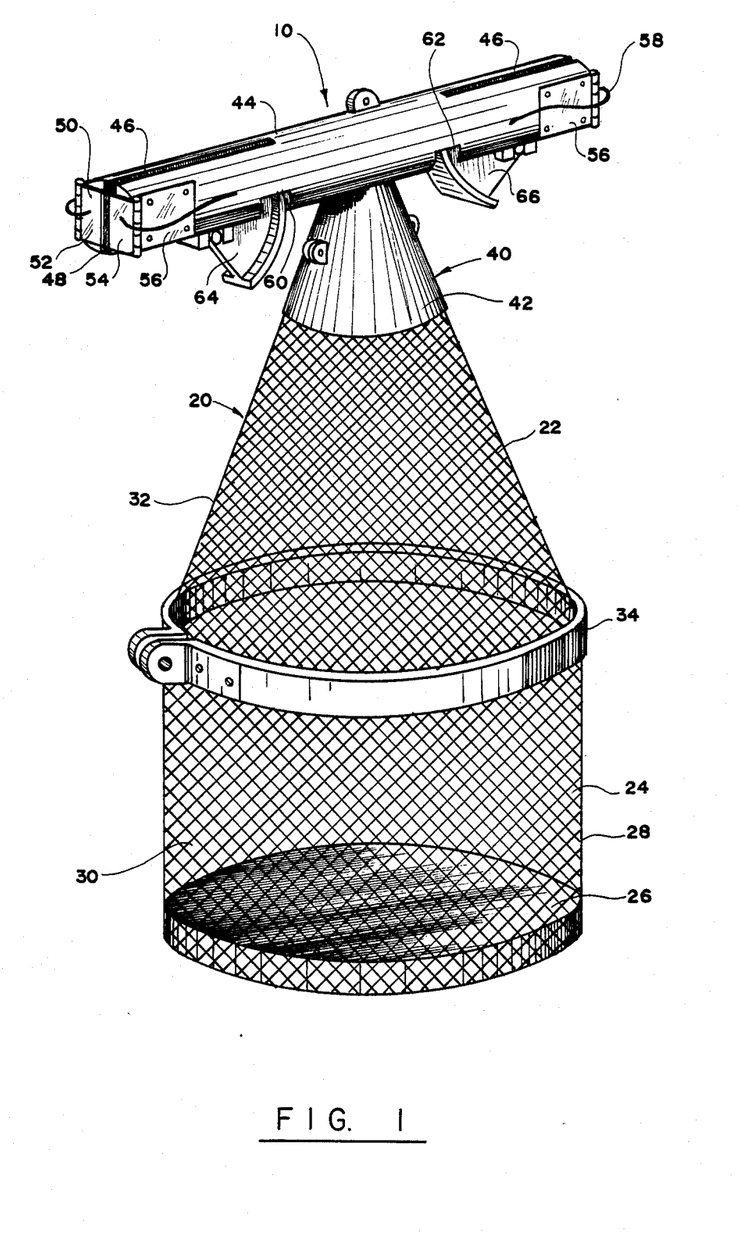
FIG. 1 perspective is a perspective view of a first embodiment of the present invention.
Figure 2:
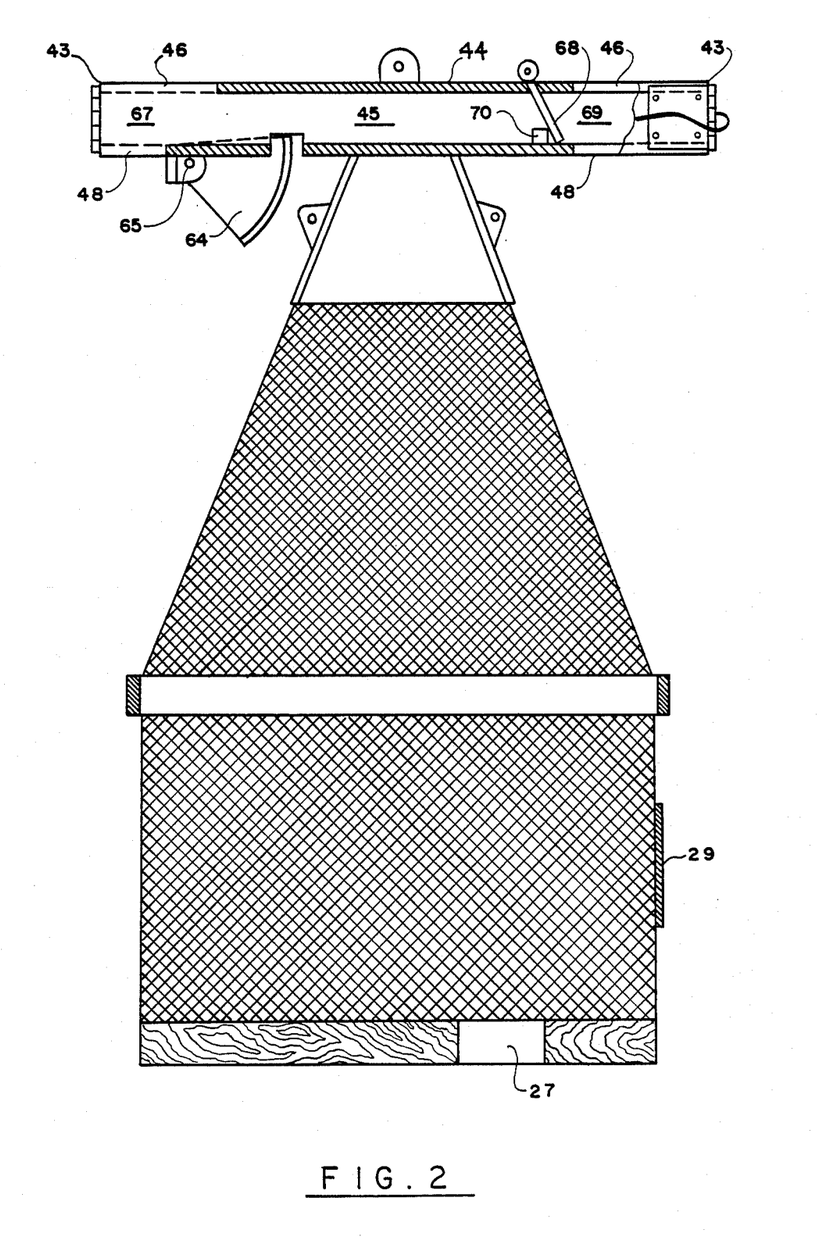
FIG. 2 is a cross-sectional view of a second embodiment of the present invention.

Turning now to the drawings, FIGS. 1 and 2 show the first preferred embodiment of the cricket dispenser in accordance with the present invention.

The cricket dispenser, designated by numeral 10 in the drawings, comprises a housing 20 divided into an upper portion 22 and a lower portion 24. The lower portion 24 has a closed bottom 26 and a generally cylindrical wall 28 extending vertically upward from the bottom 26. The upper portion 22 is mounted atop the lower portion 24 and is of a generally frustoconical shape. The wall of the conical portion 22 and of the cylindrical portion 24 is made of such material as plastic mesh, for example, to allow free air circulation between the interior chamber 30 formed by the wall 28 of the portion 24 and by the wall 32 of the portion 22 and exterior of the housing. The interior chamber is adapted to receive a plurality of live bait, for example, live crickets, and retain them until the crickets are dispensed. To secure the upper portion 22 to the lower portion 24, a circular clamp 34 can be employed, the clamp surrounding the wall 32 and the wall 28 at the point where the frustoconical portion 22 meets with the cylindrical portion 24. Alternatively, a snap securing means can be used to secure the upper portion 22 to the lower portion 24. Mounted at the apex of the frustoconical portion 22 is a dispensing conduit means 40, which comprises a first frustoconical part 42 and a second, generally cylindrical part 44.

The frustoconical part 42 is sized to be mounted atop the uppermost portion of the frustoconical portion 22 and to fixedly engage that portion. The cylindrical part 44 is provided with a central opening 45, the middle portion of which communicates with the interior of the housing 20 through the conical portion 22. A pair of diametrically opposite longitudinal slots 46 and 48 extend from each end of the cylindrical portion 44 inwardly. The function of the slots will be explained in more details hereinafter. Open ends of the cylindrical part 44 are substantially closed by a spring-operated exit door 50 which comprises a pair of flaps 52 and 54 which are hingedly mounted through securing plates 56 and hinges to the cylindrical part 44. Tension spring 58 is provided for each flap 52 and 54 so that the flaps 52 and 54 are normally forced into closed position, substantially covering the open end of the cylindrical part 44. A pair of bottom rectangular slots 60 and 62 are provided at a distance from the elongated slots 48. The slots 60 and 62 allow admittance of at least a part of trap doors 64 and 66 into the central opening of the cylindrical part 44. The doors 64 and 66 are hingedly mounted on the lower side of the cylindrical part 44, and in their normal position are lowered, under gravity, so that the largest portion of the trap doors extends away from the central opening of the cylindrical part 44, without obstructing the central opening and the passageway formed by this opening. The size of the trap doors 64 and 66 is such that when they are moved into an upper, obstructing position within the central opening 45 of the upper part 44, they form a trap area at each end 43 of the member 44.

Alternatively, the trap door can be in the form of a downwardly depending flap 68, is as better shown in FIG. 2. The flap door 68 extends downwardly, transversely to longitudinal axis of the central opening 45, terminating near the bottom of the cylindrical part 44. A stop means 70 allows pivotal movement of the flap door 68 only in one direction: from the middle portion of the conduit 45 towards the end 43 of the cylindrical part 44.

Access to the interior chamber 30 can be obtained through an opening 27 in the bottom 26 of the cylindrical portion 44 or through a side door 29 made in the cylindrical wall 28 of the portion 24.

Figure 5:
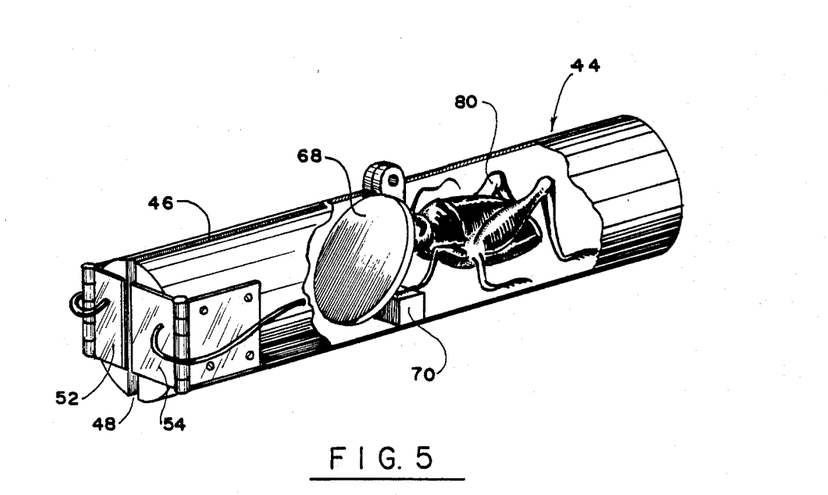
FIG. 5 is a detailed view showing a dispensing conduit with the live bait approaching the end of the dispensing conduit.

Operation of the bug dispenser will now be described in more detail. A plurality of live bait, such as crickets is admitted into the interior chamber 30 through either door 27 or 29 and is deposited on the bottom 26 of the dispenser. Since crickets tend to always move from a larger space to crevises or slots, they will climb upwardly along the meshed wall 28 and 32 into the internal conduit 45. The diameter of the central opening 45 is such as to allow one cricket to move along the passageway towards the end 43 of the upper part 44. When a first embodiment, having a pair of trap doors is used, then, if a fisherman sees that one cricket has reached the end portion 43 of the cylindrical part 44, and positioned himself adjacent the slots 46 and 48, then trap door 64 is manually operated, moved upwardly on the hinge 65 so that the cricket is separated from the rest of the passageway 45 and from the rest of the crickets. It is preferable that the trap door 64 be positioned at a distance from the end 43 to allow accommodation of one live bait within the area of entrapment 67. If the embodiment with a flap door 68 is used, then the cricket, moving forward towards the end 43, will push the flap door 68 upward, opening access into the entrapment area 69 at the opposite end of the cylindrical part 44 and the flap door will close, by gravity, trapping the cricket within the area 69. It will be appreciated that the doors 50 on both ends 43 of the cylindrical part 44 prevent the cricket from escaping from areas 67 and 69. The spring 58 keeps constant force on the flaps 52 and 54 closing the ends 43 of the cylindrical part 44 and preventing the cricket from pushing the flaps 52 and 54 open. A fisherman then inserts a fish hook into the slot 46, through a cricket 80, and withdraws one cricket at a time from the entrapment area 67 or 69. The flap doors 50 are opened through application of the force on the fish hooked cricket against the inner side of the flaps 52 and 54. Should more than one cricket be an excess into the dispensing conduit, the spring-operated exit door 50 by design will only allow removal of the hooked cricket, closing the flaps 52 and 54 in front of the next cricket. Operation of the flap door 68 is also shown in FIG. 5 of the drawings.

Figure 3:
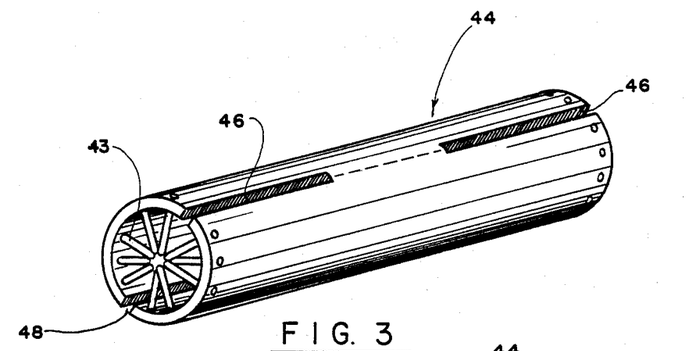
FIGS. 3 and 4 show various embodiments of the dispensing conduits in accordance with the present invention.
Figure 4:
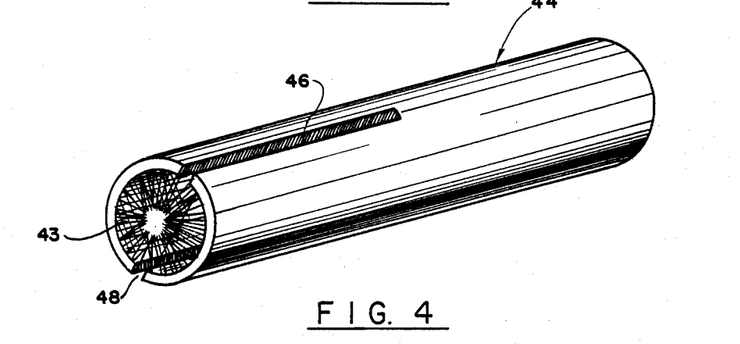

It was observed that crickets feel their way with antennas, before they proceed into a certain area. It was found beneficial to cover the ends 43 in such a manner as to allow air circulation within the central opening 45, while the ends 43 are still closed for the cricket, preventing its escape from the entrapment areas 67 and 69. FIG. 3 and 4 show such alternative closing of ends 43. As shown in FIG. 3, a plurality of flexible, such as for example, plastic, cords, rubber sheet are stretched diametrically across the central opening at the end 43, thereby preventing escape of the live bait from the cylindrical part 44. FIG. 4 shows another embodiment, wherein a plurality of flexible members, such as strings is stretched diametrically across the end 43, likewise preventing undesirable escape of the cricket from the central conduit 45. The flexible members can be glued or similarly affixedly attached at one of their ends to the end 43, so that when the cricket feels the flexible members with its antennas, it will not move further than the end 43. The flexible members are easily stretched and opened by the application of the forceable fish hook pulled through the slots 46 and 48, after the cricket 80 has been fishhooked.

Figure 6:
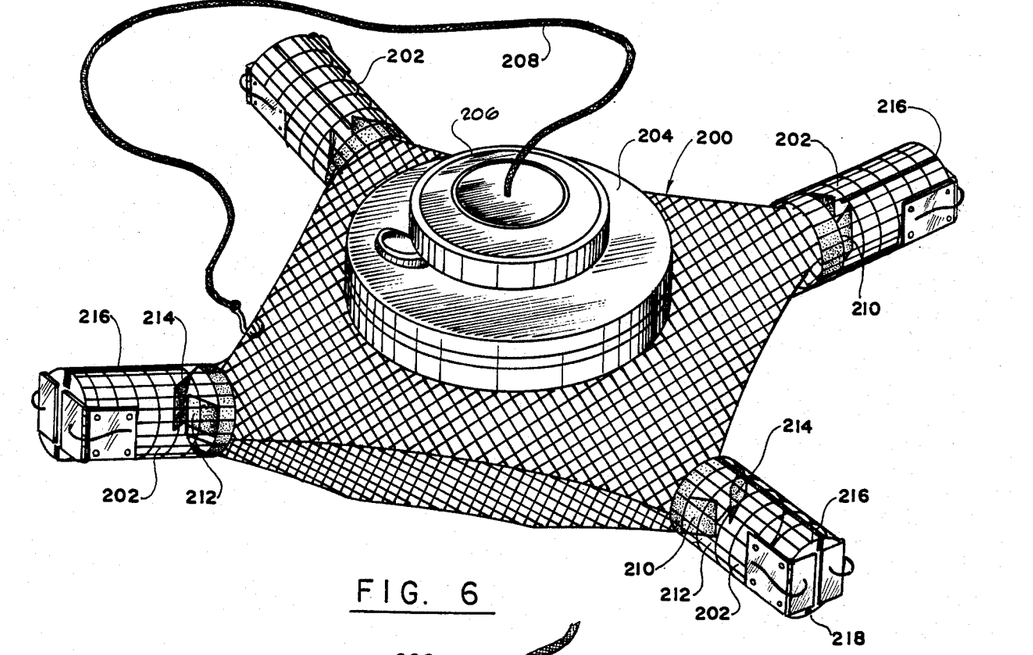
FIG. 6 is an elevational view of another embodiment of the present invention.
Figure 7:
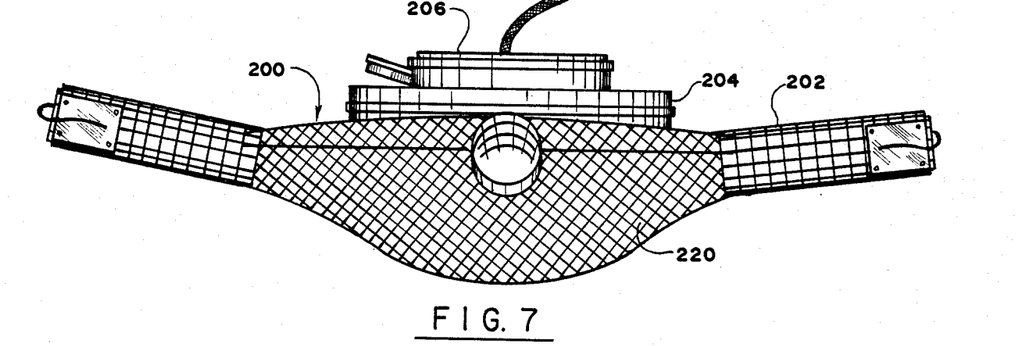
FIG. 7 is a side view thereof.
Figure 8:
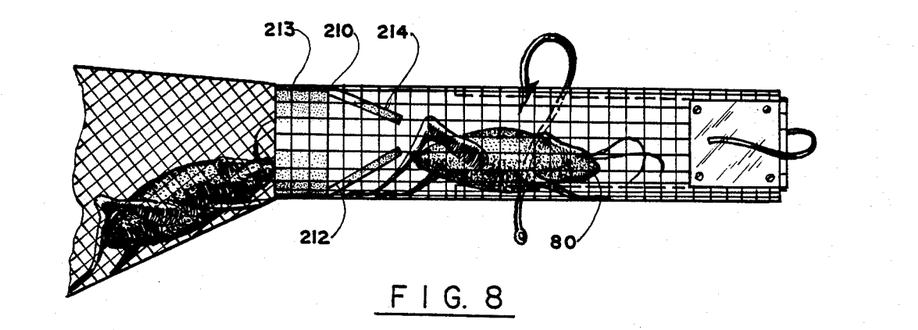
FIG. 8 is a detail view of the dispensing conduit of the embodiment shown in FIGS. 6 and 7, with the live bait about to be fish hooked.

FIGS. 6, 7 and 8 show another embodiment of the present invention, wherein the housing 200 is formed from a plastic mesh in a frustopyramidal shape, with a base of the pyramid forming the top of the housing.

As was mentioned above, the crickets have a tendency of moving into narrow areas such as crevices and to this end, the present embodiment provides for a multicornered housing, to each corner of which a dispensing conduit means 202 is securely attached. The dispensing conduits, are likewise made of mesh material, such as plastic or metal mesh, to allow for air circulation within the housing and the conduits. Access to the housing 200 is obtained through door means 204 mounted about a circular opening made in the base of the frustopyramidal housing 200. The flap door portion 206 opens upwardly to allow the crickets to be deposited within the housing 200. A flexible cord 208 can be attached to the flap door 206 and secured around the neck of a fisherman or simply suspended from any stable member, with a second end of the flexible end 208 being attachable to the mesh of the housing 200. In this manner, the crickets are more accessible to the fishermen, since it allows wearing of the dispenser on the neck without the necessity to reach for the dispenser on the deck of a boat or the like.

As can be further seen from FIG. 6, the conduits 202 are provided with trap doors 210 mounted within the conduit 202 at the point of its attachment to the housing 200. The door 210 is formed by angularly disposed flaps 212 and 214 which are inclined or bent inwardly, almost touching each other at their innermost ends.

The flaps 212 and 214 are attached to a flexible insert 213, so that the cricket 80, when moving through the trap door 210, pushes the flaps open, gaining access into the end portion of the conduit 202 while the flaps 212 and 214, made of flexible plastic, will return to their original position, an an angle to each other, almost closing the conduit 202 on the interior thereof. A pair of elongated slots 216 and 218 are made in the conduit 202 on the diametrically opposing portions of the conduit and their function is similar to the function of slots 46 and 48 of the embodiment shown in FIGS. 1-5. A spring-operated hinged door is mounted at the very end of the conduit 202, its function being similar to the function of the door 50 disclosed in the description of the embodiment shown in FIGS. 1-5 above.

It should be noted that the housing 200 can be made of other shapes, such as for example, concave bottom housing 220 as shown in FIG. 7, and the distance between the base of the housing and the top portion of it can be suitably adjusted to allow for creation of narrow areas to permit crickets to seek refuge therein.

Figure 9:
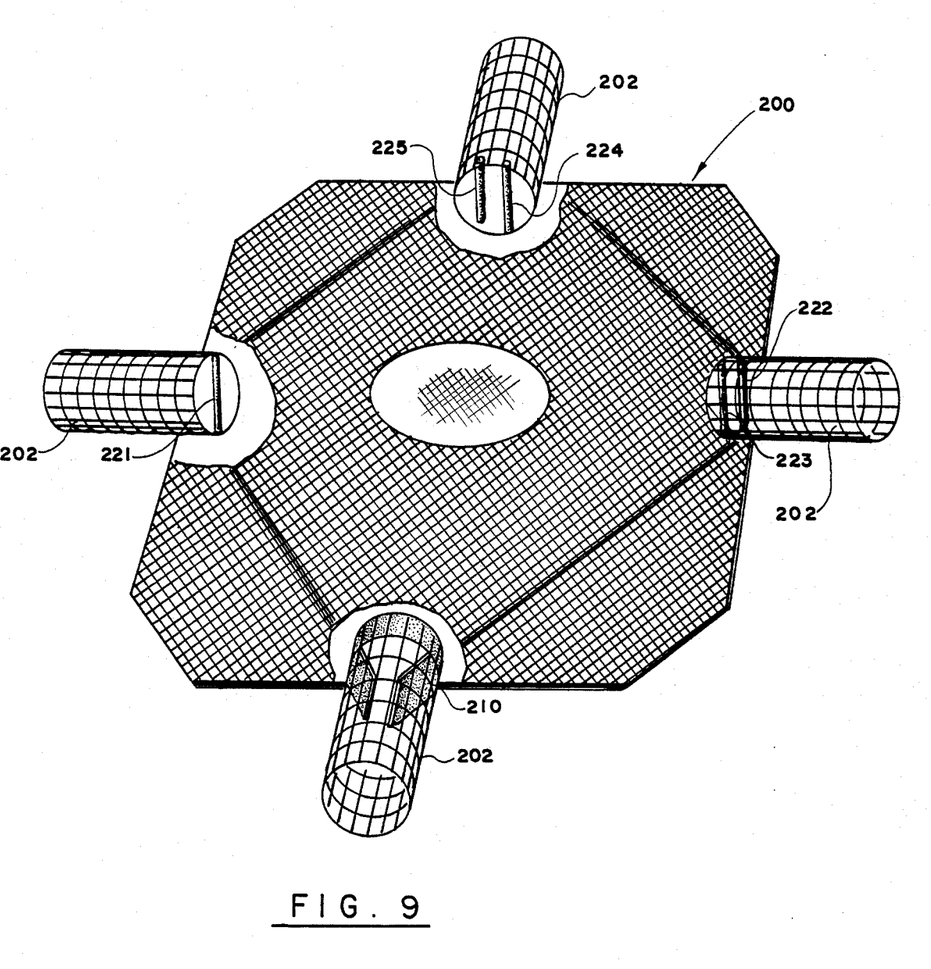
FIG. 9 is a top, partially cutaway view showing still another embodiment of the present invention.

Similarly, the position of the conduits 202 in relationship to the housing 200 can be changed, and as shown in FIG. 9, the conduits can be positioned not at the corners of the housing but midway between the sides and the ends of the housing.

FIG. 9 further shows another entrapment means which can be utilized in the live bait dispenser in accordance with the present invention. As shown in FIG. 9, a trap means is made in the form of a singular wire 221 positioned diametrically across the interior of the conduit 202.

It has been observed that since the dimensions of the conduit are such that the cricket cannot turn around and move head forward back into the interior of the housing, he can move backward and if his hind legs touch an obstacle, then a cricket stops its backward movement and resumes the forward movement. Therefore, if a hind leg of a cricket touches the wire 221 while the cricket is moving backwards, this movement is interrupted and the cricket will not move back into the housing. Alternatively, instead of one singular wire 221 a pair of spaced apart wires 222, 223 can be used, as shown in relation to another conduit in FIG. 9 or a pair of wires 224, 225 in laterally spaced relationship can be used, as shown in the other conduit 202 of FIG. 9.

Figure 10:
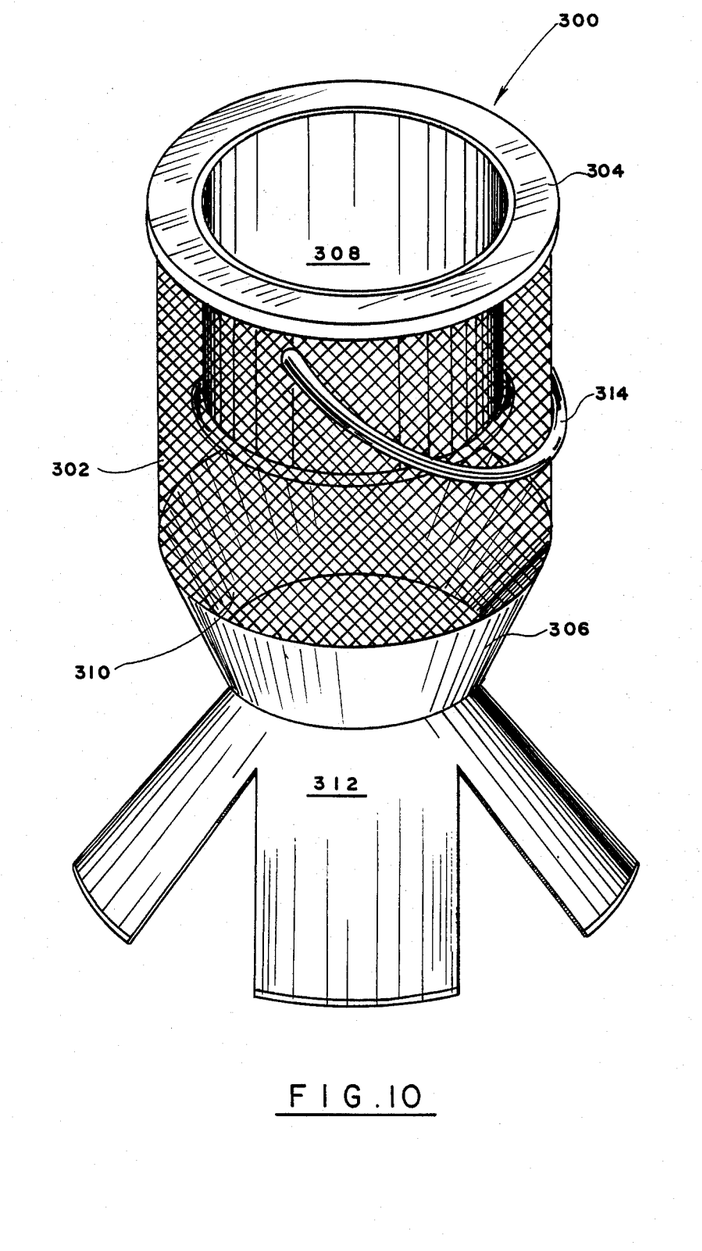
FIG. 10 is an elevational view of a further embodiment of the present invention.
Figure 11:
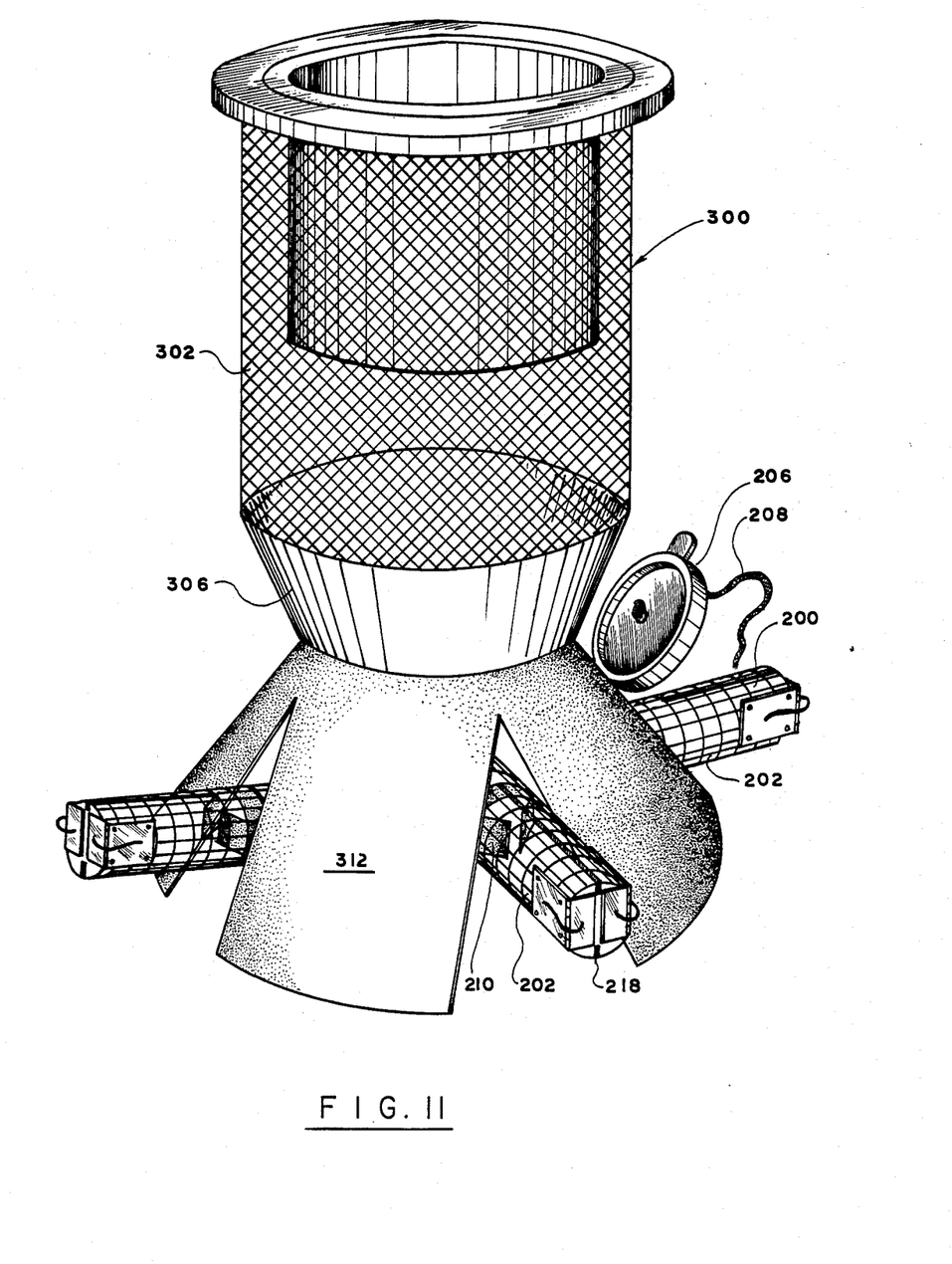
FIG. 11 is an elevational view of the embodiment of the present invention, wherein embodiments shown in FIGS. 6 and 10 are combined.
Figure 12:
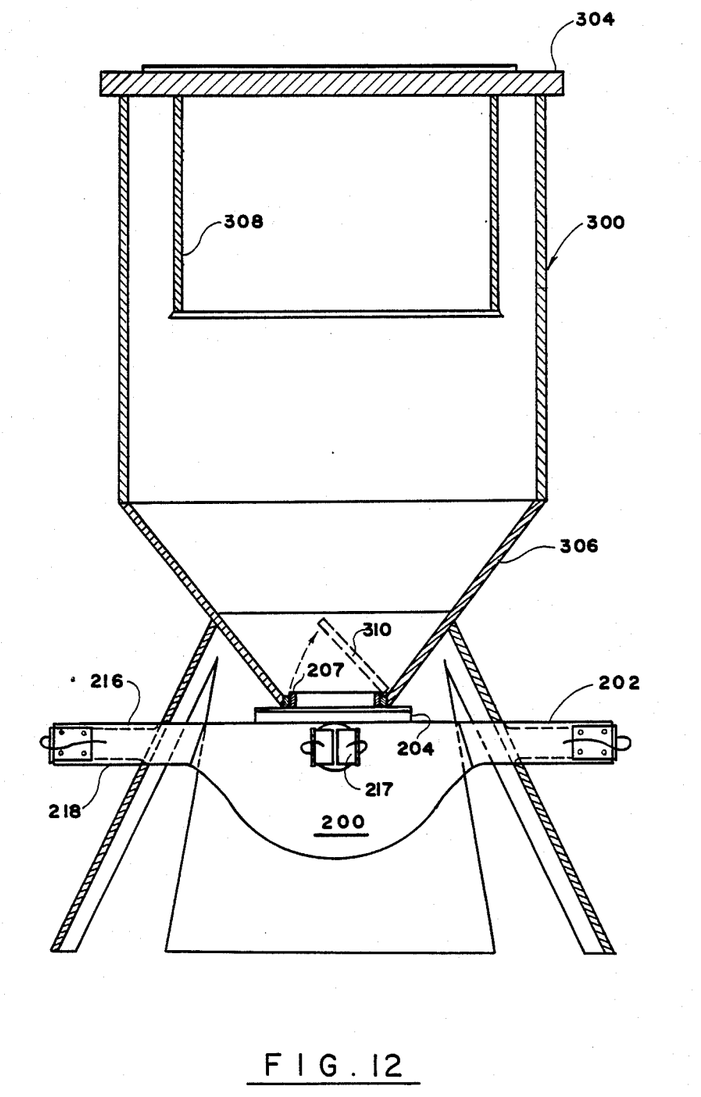
FIG. 12 a cross-sectional view of the embodiment shown in FIG. 11.

FIGS. 10, 11 and 12 show still another embodiment of the present invention. As can be seen in FIG. 10, a substantially cylindrical housing 300 is provided with a mesh sidewall 302 with a top rim 304 and a frustoconical bottom portion 306.

The rim 304 extends naturally inwardly from the edge of the wall 302 and an internal sleeve 308 projects downwardly from the internal edge of the rim 304. Sleeve 308 has a smaller diameter than the interior wall of the housing 300. As can be seen in FIG. 10 the walls of the internal sleeve 308 and the rim 304 are made of a material having a smooth surface to take advantage of the inability of crickets to climb upward on smooth surfaces. The frustoconical portion 306 is also made of a similar smooth material, as well as the bottom 310 positioned at the apex of the frustoconical portion 306. The support 312 extends at an angle to the vertical axis of the container 300, the support comprising a frustoconically shaped base, with the apex of the cone coinciding in diameter with the apex of the frustoconical portion 306. A plurality of triangular slits are made in the support 312, the function of the slits will be explained in detail hereinafter. The handle 314 can be attached to the housing 300 to allow for easy carrying of the housing by a fisherman.

The crickets are admitted into the housing 300 through the opening in the sleeve 308, so that they fall into the bottom portion 310 of the housing. The crickets can crawl up the wall 302 upwardly but the rim 304, being smooth on the interior side of it, prevents escape of the crickets into the opening made in the sleeve 308. While dispensing of the crickets can be obtained through reaching into the sleeve 308, still the preferred embodiment would use the housing 300 in combination with live bait dispenser shown in more details in FIGS. 6 and 7. As can be seen in FIG. 11, the housing 200 is positioned in such a way that conduits 202 protrude from the triangular slits made in the support 312 allowing the crickets which have been deposited into housing 300 to gain access into the housing 200. In addition to providing support to the housing 300, the base 312 also serves as a sun shade for the crickets, since it was observed that crickets prefer to crawl into shaded, narrow areas. If such combination is used, then the flap door 206 is opened and the rim of the door means 204 (not shown) pushes upwardly the bottom 310 of the housing 300, as can be best seen in FIG. 12. In this manner, the crickets deposited into the housing 300 will directly fall into the housing 200, since the door 310 of the housing 300 is elevated by rim 207 of the locking door means 204.

Trap doors 217 cover the ends of the conduits 202 similar to the trap door 50 of the embodiment shown in FIGS. 1–5. The slots 216 and 218 provided in each of the conduits 202 allow for fish hooking of the cricket trapped within the conduit 202 at the end portion thereof.

Figure 13:
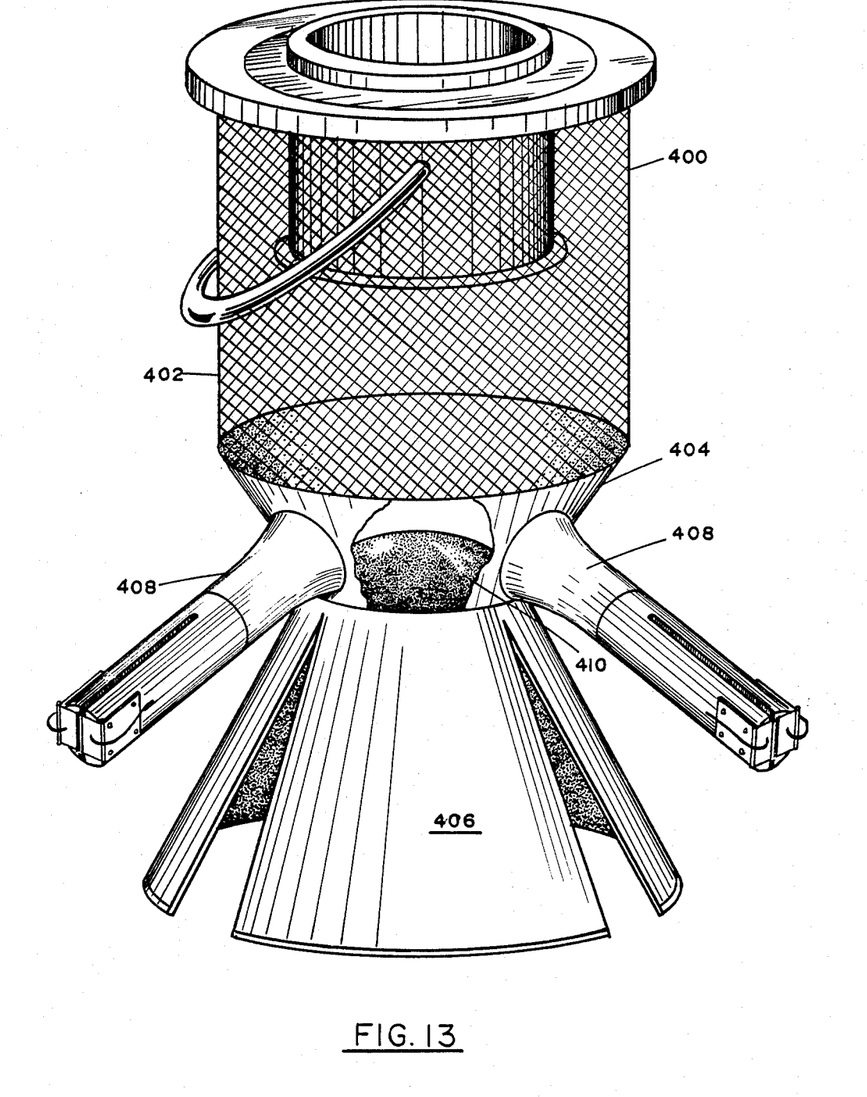
FIG. 13 is an elevational, partially cutaway view of still another embodiment of the present invention.
Figure 14:
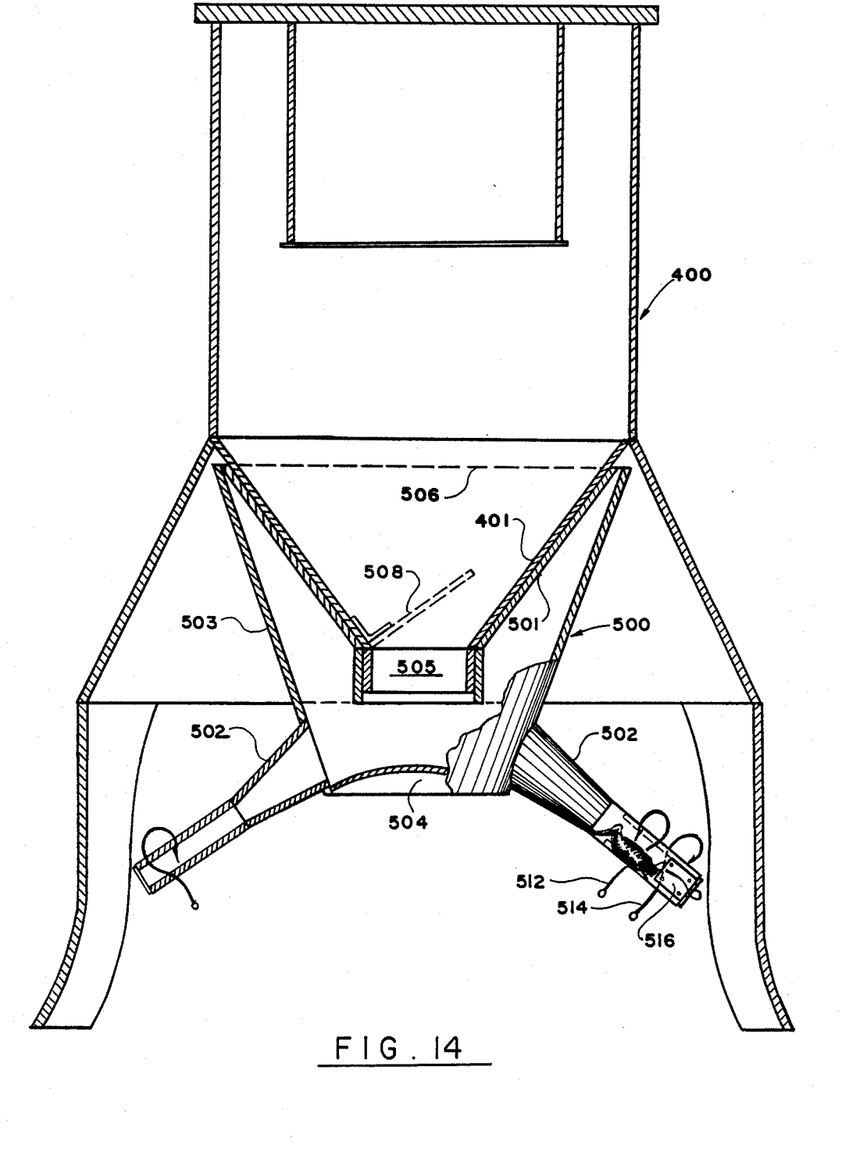
FIG. 14 is a cross-sectional view of a further embodiment of the present invention.

Referring now to FIGS. 13 and 14, a further embodiment of the present invention is shown, wherein the live bait dispenser comprises a housing 400 having a substantially cylindrical upper portion 402, having a wall made of a mesh material, similar to the top portion of housing 300. The lower portion of the housing 400 designated by numeral 404 is made of a smooth surface material in a generally frustoconical shape, with an apex of the cone facing downwardly. The support 406 is attached to the bottom portion 404 with the apex of the frustoconical support 406 meeting the apex of the frustoconical portion 404. A plurality of dispensing conduits 408 communicate with the interior of the housing 404, and specifically with the lowermost portion thereof. The dispensing conduits 408 extend at an angle to a vertical longitudinal axis of the housing, so that the cricket cannot climb backwards, towards the housing 400 once he has crawled into the dispensing conduit 408. It should be noted that the interior of the conduit 408 is preferably made smooth, to prevent return of the crickets from the dispensing conduit into the interior of the housing.

A convex bottom 410 of the housing 400 likewise has a smooth surface, so that the crickets, once dropped into the housing 400 will move downwardly onto the bottom 410 and immediately into the conduits 408 which are attached to the housing 400 adjacent the bottom portion thereof.

FIG. 14, shows an embodiment similar to that shown in FIG. 13, but dispensing conduits 502 are provided in the attachment 500 which can be mounted onto the frustoconical portion 404 or 306 of the embodiments shown in FIGS. 13 and 12, respectively. It should be noted that in the embodiment shown in FIG. 13, frustoconical portion 404 and cylindrical portion 402 are fixedly attached to each other. Conduits 408 are likewise fixedly connected to the frustoconical portion 404 and extend at an angle thereto. Attachment 500 can also be used in conjunction with container 300 and frustoconical portion 306 depicted in FIG. 12, if some minor modifications are made to portions 306 and 312. FIG. 14, though, better illustrates how removable attachment 500 is connected to the housing 400 in a removable, detachable relationship to the housing. The housing 500 is provided with a closed convex bottom 504 and open top 506 so that the crickets deposited into the cylindrical portion 400 will move downwardly, through open top 506 and opened trapped door 508 and then into the attachment 500, to the bottom portion thereof. The frustoconical portion 401 of the housing 400 fits within a complementary frustoconical portion 501 of the attachment unit 500. The walls forming frustoconical portion 501 are preferably made of plastic or wire mesh, so as to allow the crickets to climb over the wall. The outside frustoconical wall 503 of the attachment 500 forms a cavity therein, which communicates with the interior chamber formed by the frustoconical wall 501, so that crickets which have gained access into the open top 506 drop or descend along the wall into the opening 505, when the trap door 508 is opened, and drop onto the convex bottom 504 of the attachment unit 500. The dispensing conduits 502 are attached at an angle to the housing 502 adjacent smooth bottom 504 so as to facilitate movement of the crickets into the conduits 502. The trap door 508 of the housing 400 is similar in operation to the trap door 310 of the embodiment shown in FIG. 12. Likewise, it is pushed open by the rim of the attachment 500, since it is pivotally mounted in the bottom area of the housing 400. The conduits 502 have an interior smooth surface and are provided with upper and lower elongated slots to allow hooks 512 or 514 to be inserted therein for fishhooking of that cricket which has reached the end portion of the conduit 502. Suitable spring operated door 516 (or other described above exit door means) is mounted at an end of each conduit 502 so as to allow dispensing of the crickets one at a time.

It should be noted that sunshades can be provided on the housing 400 so as to prolong life of the crickets which, as a rule, cannot withstand hot sunrays and become of no use as a live bait to a fisherman. Another possible improvement that can be utilized with the live bait dispenser of the present invention provides for the use of the angularly disposed dispensing conduits, the outward end portions of which are turned horizontally, i.e., upwardly from the general alignment of the dispensing conduit, so as to enable easy withdrawal of the individual cricket. Similarly the attachment 500 can be used by itself for the purposes of retaining the live bait. In that case, the angular dispensing conduits 502 will serve as supports for the dispenser 500. Alternatively, the outside tips of the conduits 502 can be bent upwards, to further facilitate retention of the crickets within the conduit 502 and prevent accidental escape. In that case, the bent conduits would serve as supports for the dispenser 500. The dispenser 500 can alternatively be used separately with the help of a flexible cord attached to the top part thereof for suspension of the dispensing unit around a neck of a fisherman or from any suitable support.

Numerous modifications of the preferred embodiments described herein can be made by those skilled in the art without departing from the spirit and scope of the present invention, therefore, it is to be understood that the spirit and scope of the invention be limited by the scope of the appended claims.

I claim:
1. A live bait dispenser, comprising:
   a housing adapted for receiving and retaining a plurality of baits in an interior chamber formed in the housing;
   at least one dispensing conduit means attached to the housing, one open end of the dispensing conduit means communicating with the interior chamber of the housing for admitting the bait into the dispensing conduit means and the second open end of the dispensing conduit means being provided with a hingedly attached tension spring operated door means to prevent escape of the bait from the dispensing conduit means while allowing withdrawal of an individual bait from the dispensing conduit means, said tension spring operated door means being movable between a normally closed position and an open position in response to a force applied by a live bait being withdrawn from the dispensing conduit; and means to prevent backward movement of the bait from dispensing conduit means into the interior chamber of the housing, said means comprising a one-way door means pivotally mounted inside the dispensing conduit a distance from the tension spring-operated door means, said door means substantially covering interior passageway formed in the dispensing conduit when said door means is in its closed position.

2. A live bait dispenser, comprising:

a housing adapted for receiving and retaining a plurality of baits in an interior chamber formed in the housing;

at least one dispensing conduit means attached to the housing, one open end of the dispensing conduit means communicating with the interior chamber of the housing for admitting the bait into the dispensing conduit means and the second open end of the dispensing conduit means being provided with a hingedly attached tension spring operated door means to prevent escape of the bait from the dispensing conduit means while allowing withdrawal of an individual bait from the dispensing conduit means, said tension spring operated door means being movable between a normally closed position and an open position in response to a force applied by a live bait being withdrawn from the dispensing conduit; and means to prevent backward movement of the bait from the dispensing conduit means into the interior chamber of the housing, said means comprising a pivotally mounted door means for movement between a first position, wherein at least a part of the door means blocks substantially all interior of the dispensing conduit means at a distance from the second end thereof, and a second position, wherein the door means is moved away from its obstructing position inside the interior of the dispensing conduit means.

3. A live bait dispenser, comprising:

a housing adapted for receiving and retaining a plurality of live baits in an interior chamber formed in the housing;

at least one dispensing conduit means attached to the housing, one open end of the dispensing conduit means communicating with the interior chamber of the housing admitting an individual bait into the dispensing conduit means, and the second end of the dispensing conduit means being provided with a means to prevent accidental escape of the live bait from the dispensing conduit means, said means comprising a plurality of thread-like flexible members attached to the dispensing conduit means and extending to a distance within the dispensing conduit means tranversely to a longitudinal axis of the conduit.

4. A live bait dispenser comprising:

a housing having a substantially cylindrical upper portion with an open top and an inverted frustoconical lower portion with a closed bottom;

a base supporting the housing securely connected to the lower portion at an apex thereof; and an internal sleeve having a smaller diameter than the upper portion, securedly connected at a top of the cylindrical portion and extending downwardly therefrom, terminating a distance above the bottom of the lower portion, the internal sleeve having a smooth exterior surface and the lower portion of the housing having a smooth interior surface to prevent the live bait from escaping through the open top of the upper portion.

5. A live bait dispenser, comprising:

a housing for receiving a plurality of live bait units, the housing having a generally cylindrical upper part and an inverted frustoconical lower part to facilitate concentration of the live bait therein, an apex of the frustoconical part carrying a pivotally attached bottom of the housing, the housing being supported by a support means securedly attached to a lower part of the housing; and a bait dispensing attachment detachably connectable to said housing in bait receiving relationship thereto, said bait dispensing attachment being provided with at least one bait dispensing conduit adapted for trapping an individual live bait unit within a dispensing area, while preventing other bait units from reaching the dispensing area, when the individual live bait unit is located within the dispensing area; and wherein the bait dispensing attachment is provided with an access means adapted for mounting in alignment with the pivotally attached bottom of the housing in such a manner that a rim of the access means forces the pivotally attached bottom of the housing into an open position, thus allowing the live bait to move from the housing into the dispensing attachment.

6. The apparatus of claim 5, wherein the bait dispensing attachment comprises at least one bait dispensing conduit aligned at an angle to a vertical axis of the housing.

7. The apparatus of claim 5, wherein the dispensing attachment comprises a concave bottom to facilitate movement of the live bait into the dispensing conduit.

8. The apparatus of claim 5, wherein the bait dispensing attachment comprises at least one live bait dispensing conduit aligned tranversely to a vertical axis, of the housing.

9. The apparatus of claim 8, wherein the dispensing conduit comprises a spring-operated exit door means to prevent escape of the live bait from the dispensing conduit.

10. The apparatus of claim 8, wherein the dispensing conduit is provided with a pair of longitudinal slots extending inwardly diametrically opposite each other from an outer end of the bait dispensing conduit to allow fishhooking of the live bait located between the slots.

11. A live bait dispenser, comprising:

a housing adapted for receiving and retaining a plurality of baits in an interior chamber formed in the housing;

at least one dispensing conduit means attached to the housing, one open end of the dispensing conduit means communicating with the interior chamber of the housing for admitting the bait into the dispensing conduit means and the second open end of the dispensing conduit means being provided with a hingedly attached tension spring operated door means to prevent escape of the bait from the dispensing conduit means while allowing withdrawal of an individual bait from the dispensing conduit means, said tension spring operated door means being movable between a normally closed position and an open position in response to a force applied by a live bait being withdrawn from the dispensing conduit; and wherein said dispensing conduit is securely attached at an angle to a vertical axis of the housing and the interior surface of the conduit is smooth to prevent backward movement of the live bait from the dispensing conduit means into the interior chamber of the housing.

* * * * *